United States Patent [19]
Reynal et al.

[11] Patent Number: 5,455,781
[45] Date of Patent: Oct. 3, 1995

[54] APPARATUS AND METHOD FOR DETERMINING THE MEASUREMENT ACCURACY OF ELECTRONIC GAS METERS

[75] Inventors: Thomas J. Reynal; Craig S. Graber, both of Houston, Tex.

[73] Assignee: Dresser Industries, Inc., Dallas, Tex.

[21] Appl. No.: 114,453

[22] Filed: Aug. 31, 1993

[51] Int. Cl.$^6$ .............................. G01F 25/00; G06G 7/57
[52] U.S. Cl. ........................ 364/579; 364/509; 364/510; 73/3; 73/196
[58] Field of Search ...................................... 364/579, 509, 364/510, 571.03, 571.05; 73/3, 4 R, 195, 196

[56] References Cited

U.S. PATENT DOCUMENTS

| | | | |
|---|---|---|---|
| 4,253,156 | 2/1981 | Lisle et al. | 364/510 X |
| 4,419,880 | 12/1983 | Hanowich | 73/3 |
| 4,590,790 | 5/1986 | Hicks et al. | 73/3 |
| 4,593,365 | 6/1986 | Haley, Jr. et al. | 73/195 X |
| 4,658,634 | 4/1987 | Killough et al. | 73/3 |
| 4,918,995 | 4/1990 | Pearman et al. | 73/861.02 |
| 4,953,386 | 9/1990 | Pearman et al. | 364/510 X |
| 4,965,756 | 10/1990 | Pearman et al. | 364/571.01 |
| 5,072,416 | 12/1991 | Francisco, Jr. et al. | 364/510 X |

OTHER PUBLICATIONS

Dresser Manufacturing Division Dresser Measurement, "Roots Prover Model 4 Installation–Operation–Maintenance", RPO–4, Revision #4, 1983–no month.

*Primary Examiner*—Ellis B. Ramirez
*Assistant Examiner*—M. Kemper
*Attorney, Agent, or Firm*—Jones, Day, Reavis & Pogue

[57] ABSTRACT

An apparatus and method for automatically determining the measurement accuracy of an uncalibrated field fluid flow meter by comparing its fluid flow volume, measurement, $V_f$, to a fluid flow volume measurement, $V_m$, of a master meter of known accuracy. The apparatus comprises fluid flow device operably coupled to the field and master meters for passing a common fluid stream through each of the meters at a predetermined flow rate until a predetermined volume of fluid has been registered by the field meter; a first measurement signalling device for a generating data representing the fluid volume registered by each of the meters; a second signalling device for generating data representing input temperatures and pressures to each of the meters; and a computer coupled to the fluid flow device for automatically controlling the flow rate and calculating the accuracy of the field meter.

18 Claims, 8 Drawing Sheets

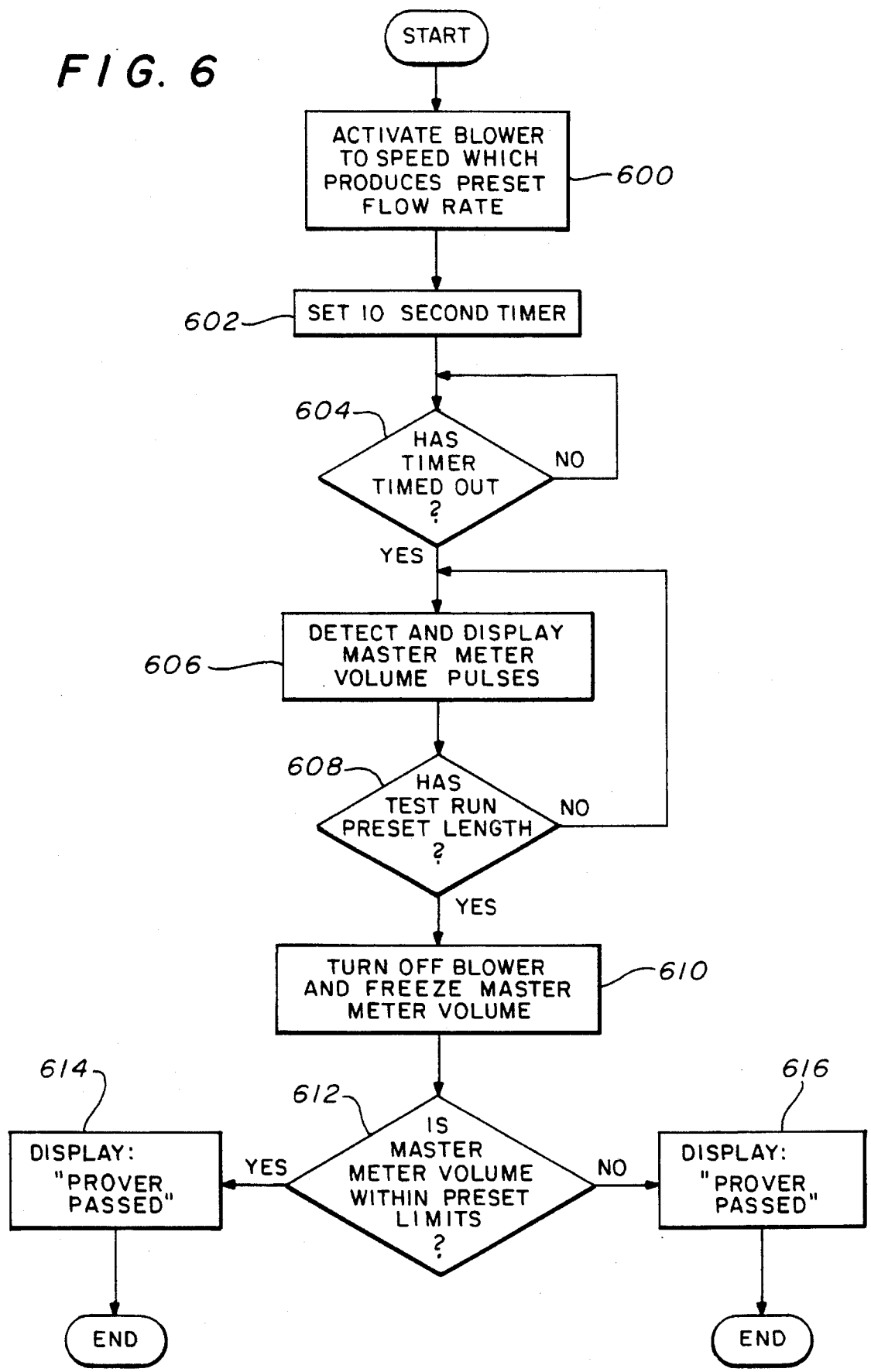

APPARATUS AND METHOD FOR DETERMINING THE MEASUREMENT ACCURACY OF ELECTRONIC GAS METERS

BACKGROUND OF THE INVENTION

1. Field of the Invention

This invention relates to an apparatus and method for determining the measurement accuracy of an uncalibrated field meter, such as a gas meter, by comparing its flow measurement to a master meter of known accuracy.

2. Description of the Related Art

It is known to determine the measurement accuracy of an uncalibrated field meter by comparing its flow measurement to a master meter of known accuracy such as the Model 4 Transfer Prover manufactured by Dresser Measurement, Inc. This is called "transfer proving" and is accomplished by passing a common gas stream through both meters for some known period of time and noting the gas volume registered by each meter. A meter correction factor for the field meter is then determined by mathematically dividing the flow registered by the field meter by the master meter registered flow. Once the correction factor is determined the readings of the field meter can be divided by the correction factor to remove any measurement error in the field meter.

When the gas stream is passed through both the field meter and master meter work is done on the gas. This work causes minor changes in temperature and pressure of the fluid as it enters and exits each meter. Therefore, these changes need to be measured and used to correct the actual gas volume passing through each meter. The accuracy of the field meter can then be defined by the equation:

$$\text{Field Meter Accuracy} = V_f/V_m \cdot P_1/P_2 \cdot T_2/T_1 \cdot 100\%,$$

Where $V_f$=Field Meter Volume $V_m$=Master Meter Volume, $P_2$= Inlet Pressure of the Master Meter, $P_1$=Inlet Pressure of the Field Meter, $T_1$=Inlet Gas Temperature of the Field Meter and $T_2$=Inlet Gas Temperature of the Master Meter.

Equipment for determining the field meter accuracy can be transported on a cart to the field where the field meter is in use. It is also known, to connect a blower, a master meter and a field meter in such a manner that the blower passes a common fluid or gas stream through both the field meter and master meter. Pressure, temperature, and volume measurement devices are connected to a controller that records all the necessary data during the test and calculates the field meter accuracy. Heretofore, this test has required an operator to step through the test procedure and prompt the controller at each step. This means that a great deal of care and attention by the operator is needed to ensure reliable test results.

U.S. Pat. No. 4,965,756 to Pearman et al. discloses a method and apparatus for calibration of electronic gas meters. Pearman et al. disclose calibrating electronic gas meters using what is commonly referred to as a bell prover. In the bell prover system a bell of known volume is used to pass a known volume of fluid through the meter under test. The volume registered by the meter under test is then compared with the known volume passed through said meter to determine the accuracy of the meter under test. The major disadvantage of bell provers is that they are not suited for portable operations. They must be maintained at substantially constant temperature to deliver accurate results.

SUMMARY OF THE INVENTION

It is therefore, an object of the present invention to provide an apparatus and method for providing automatic sequence of operation in determining the accuracy of a field meter.

Another object of the present invention is to provide improved resolution and accuracy of measurement.

A still further object of the present invention is to provide an apparatus and method for easily varying the test volume and test flow rate for proving the accuracy of a meter over its operating range.

These and other objects are achieved by the present invention, which provides an apparatus and method for determining the accuracy of a meter and implementation of an automatic sequence of operation in determining the accuracy.

In accordance with one aspect of the invention, there is provided an apparatus for automatically determining the measurement accuracy of an uncalibrated field fluid flow meter by comparing its fluid flow volume, $V_f$, measurement to the fluid flow volume, $V_m$, measurement of a master meter of known accuracy. The apparatus comprises a fluid flow means forming a conduit for passing a common fluid stream through both of the meters at a predetermined flow rate until a predetermined volume of fluid has passed through the field meter; first measurement signaling means for generating data representing the fluid volume registered by each of the meters; second measurement signaling means for generating data representing input temperatures and input pressures at each of the meters; and a computer coupled to the fluid flow means and the first and second measurement signaling means for automatically controlling the predetermined flow rate and calculating the field meter accuracy.

In accordance with another aspect of the invention, there is provided a method for automatically determining the measurement accuracy of an uncalibrated field fluid flow meter comprising the steps of operably connecting fluid flow means to the field meter and the master meter for passing a common fluid stream through both of the meters; connecting a controller to the fluid flow means, the field :meter, and the master meter, and connecting a computer to the controller; adjusting the fluid flow means with the controller to obtain a predetermined flow rate through the field and master meters; gathering data with the controller representing fluid flow volume from the master meter and the field meter, temperature and pressure of the fluid at inputs to the field and master meters; freezing the master meter volume data when a predetermined volume is indicated by the field meter; and calculating a proof, accuracy, and error of the field meter relative to the master meter with the computer from the gathered data.

BRIEF DESCRIPTION OF THE DRAWINGS

These and other objects of the present invention will be more fully understood in conjunction with the accompanying drawings in which like numbers indicate like components and in which:

FIG. 6 is a flow chart of the operation of the system for performing a prover operational test.

DESCRIPTION OF THE PREFERRED EMBODIMENT

Figure 1:
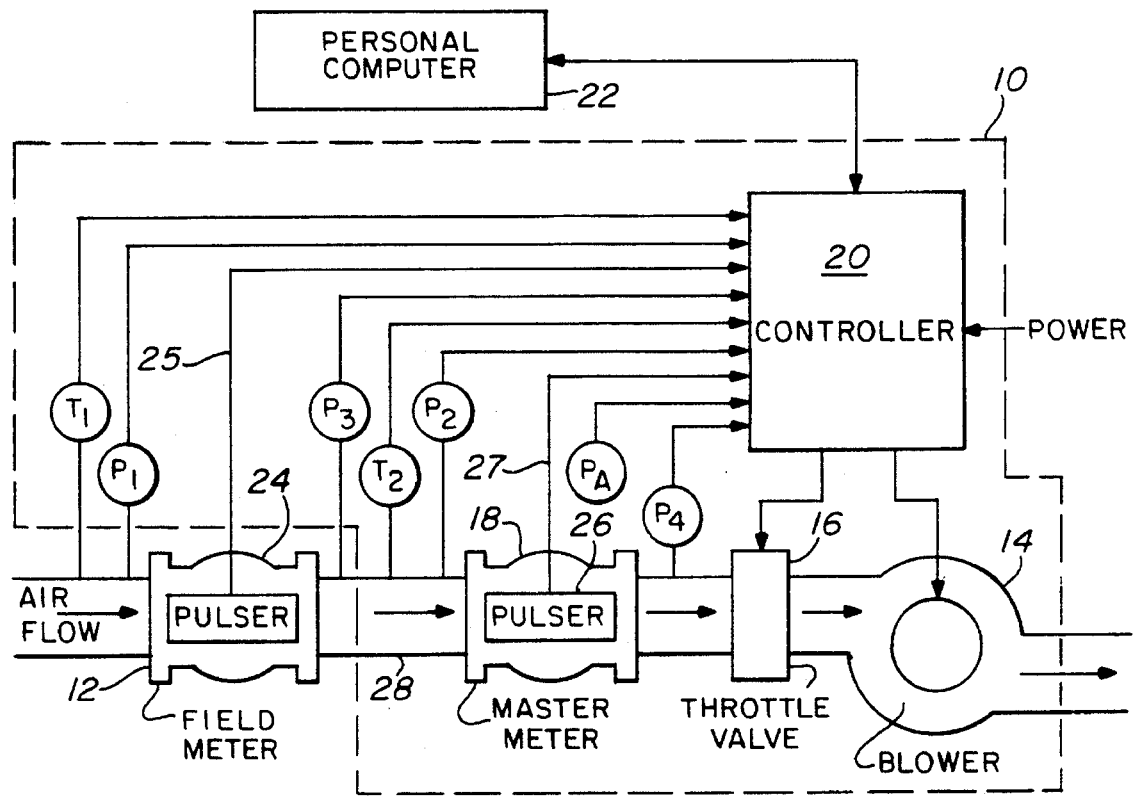
FIG. 1 is a flow diagram of an apparatus in accordance with the present invention.

An apparatus, shown generally at 10 in FIG. 1, is connected to a field meter 12. The apparatus 10 or transfer prover as it is commonly known, is a vacuum operated system and generally includes a blower 14, a throttle valve 16, a master meter 18, a controller 20, and a personal computer 22. In addition, pressure transducers $P_1$–$P_4$ and $P_A$, connected as shown in FIG. 1, provide measurement signals of pressure values to the controller 20 for inlet and outlet pressures of field meter 12 and master meter 18 and also atmospheric pressure is provided by pressure transducer PA. Two temperature probes, $T_1$ and $T_2$ are connected to the controller 20 such that they provide measurement signals of the temperature of a fluid flow at inputs of field meter 12 and master meter 18. Lines 25 and 27 connect pulsers, 24 and 26, of the field meter 12 and :master meter 18, respectively, to the controller 20, to provide measurement signals to the controller 20 indicative of fluid flow volume passed through each of the meters.

The master meter 18 is connected to field meter 20 by a flexible hose 28 which is preferably of the type which allows for quick connection thereto. The apparatus 10 is preferably contained in an easily portable unit (not shown) to enable the apparatus to be taken to the field meter to conduct testing.

The personal computer 22 provides for an operator interface with the prover system apparatus 10. Computer 22 performs necessary operations to send commands to and receive data from the controller 20. Personal computer 22 preferably uses graphic displays to prompt an operator through a test and displays test data during tests. When a test is completed test results are computed and displayed on personal computer 22. In addition, test results can be stored for print out or downloaded to a host computer.

Figure 2:
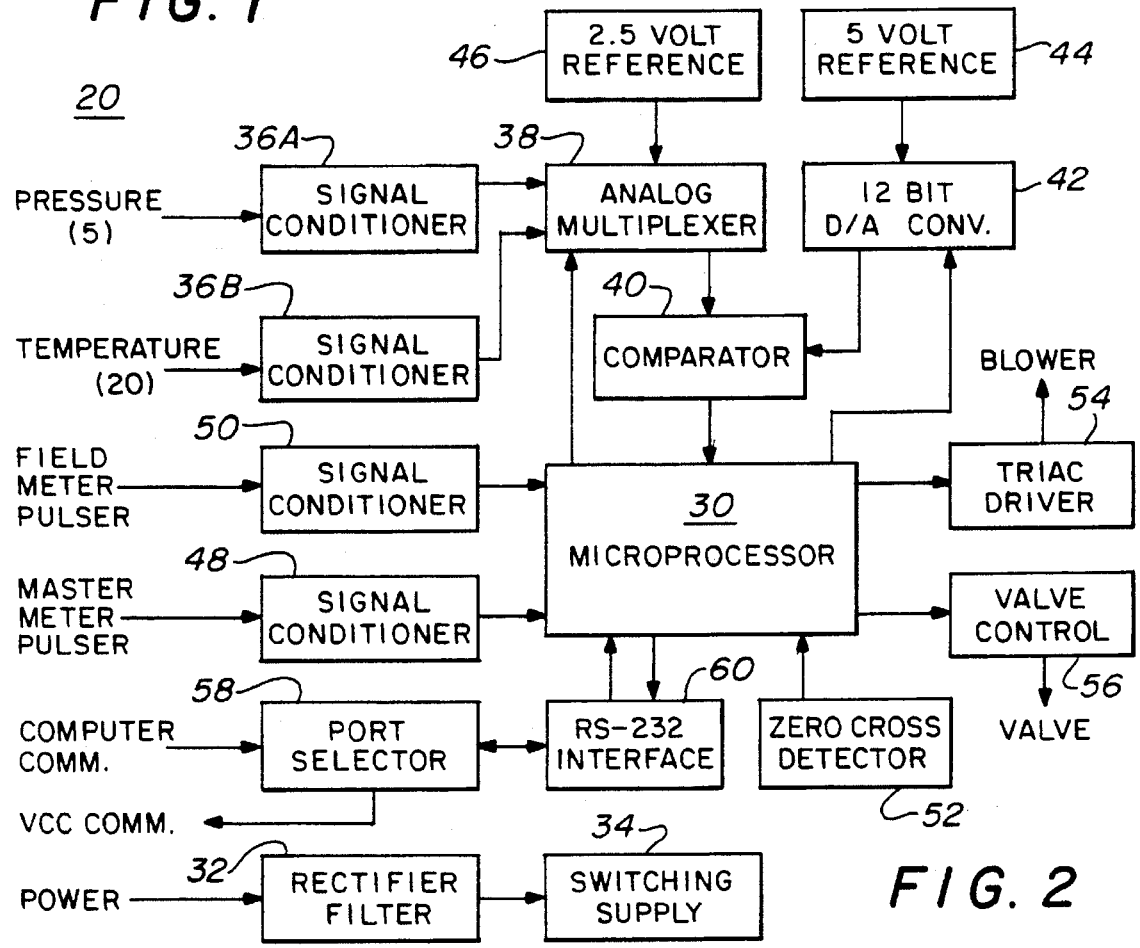
FIG. 2 is a block diagram of the controller of FIG. 1.

Referring now to FIG. 2 the controller 20 is preferably controlled by a microprocessor 30. Preferably, 12 volt AC power is supplied directly to rectifier filter 32, which is protected from transients that may occur at the line power source. A DC voltage generated by rectifier filter 32 is then applied to switching supply 34, which is, preferably, regulated by an IC to produce the required voltages needed to run the present invention.

Preferably, microprocessor 30 has internal memory for storing various programs including a program that defines the operation of its I/O ports. Also, external circuitry is used to set the internal clock frequency of microprocessor 30 to 2 MHz.

Signal conditioner 36A converts the analog pressure measurement signals of $P_1$–$P_4$ and $P_A$ from a 1-to-6 volt level to a 0.816-to-4.893 volt level and preferably, removes any high frequency noise component of the analog signals. Signal conditioner 36B converts the analog temperature measurement signals of $T_1$ and $T_2$ from a 230-to-340 microampere level to a 3.381-to-4.998 volt level and preferably, removes any high frequency noise component of the analog signals.

The outputs of signal conditioners 36A and 36B from the five pressure transducers and two temperature transducers are presented to an analog multiplexer 38 for sequential presentation to the first input of comparator 40. As those skilled in the art will appreciate, successive analog-to-digital conversion of the pressure and temperature transducer signals is accomplished by a software routine. Microprocessor 30 selects the conditioned analog signal to be converted to a digital signal. Preferably, a 12-byte digital-to-analog converter 42 is powered by a five volt reference 44 to produce a weighted signal at the second input of comparator 40, which signals the routine as to what weights are needed to produce a signal equal to the analog signal at the first input to comparator 40. A weighted 12-byte number provides a result that is the relative value of the analog signal being converted. It is stored by microprocessor 30 for transmission to computer 22 at one second intervals. It should be noted that a 2.5 volt reference 46, which is preferably formed from a shunt regulator, is implemented to check the overall accuracy of the analog-to-digital converter.

Master meter pulser 26 presents a measurement signal to a signal conditioner 48 for generating data representing the fluid volume passing through the meter. Pulser 26 is preferably a direct couple slotted wheel that passes through an optical sensor device to produce a prescribed number of pulse output signals per unit volume passed. A master meter volume counter program is provided to count the master meter pulses generated by pulser 26 by a test volume routine. During this test volume routine, discussed in detail below, when the field meter pulser 24 indicates that a prescribed test volume has passed the volume counter program is disabled, thereby freezing the master meter 18 volume data. The master meter volume is then stored in memory in microprocessor 30 for use by other program routines. A flow rate program routine also counts master meter volume pulses of pulser 26 on a one second time base to determine flow rate. This flow rate value is also stored in memory for use by other routines.

Field meter pulser 24, preferably can utilize two types of optical pick up devices to sense the field meter volume throughput for a determination of the test volume. The first device is an optical scanner that can sense either meter dial or odometer rotations and produce an electrical pulse per sensed revolution for use by microprocessor 30. The second device is an optical pulser that mounts on a meter 12 of the type that is equipped with an instrument drive. The instrument drive is a mechanical shaft that rotates one revolution per 10, 100, or 1,000 cubic feet of field meter throughput. The instrument drive optical pulser has a drive dog that connects a slotted disk to the instrument drive shaft. The slotted disk passes through two sensor assemblies that generate measurement signals that represent one complete revolution of the instrument drive shaft.

The field meter pulser 24 signals are then presented to a signal conditioner 50 before being inputted to microprocessor 30. The test volume program routine, described in detail below, is enabled ten seconds after the speed of blower 14 and the position of throttle valve 16 have been adjusted to achieve the test fluid flow rate. Then upon sensing the next field meter volume pulse the routine sends a flag to signal other routines that the test run has started. The routine then counts the pulses that follow and compares the total to the test volume that was downloaded by computer 22. When the two agree, the routine sends a flag to signal other routines that the test run has been completed.

The AC input power to controller 20 is sensed by zero crossing detector 52. A signal generated by zero crossing detector 52 is routed to a timer capture input of microprocessor 30 for processing under program control.

To achieve a required flow rate, blower 14 is adjusted by an air control routine stored in microprocessor 30. The air control routine starts an angled delay timer as each zero crossing is detected. Preferably, the angle of the delay can be varied from 20 to 80 percent of the AC input half cycle time to vary the speed of blower 14 from maximum to near stall. The routine compares the measured flow rate to the set flow rate to determine the algebraic difference. This difference is used to look up a proportional band table value stored in microprocessor 30 that is added algebraically to the angle delay timer. This process continues on a fixed time basis to nudge the blower speed to a value that yields the preset flow rate.

Upon each angle delay timer time out microprocessor 30 pulses to fire a triac driver 54 that adjusts the speed of blower 14. Triac driver 54 remains in conduction until blower 14 motor currents cross zero, which is normally about 10 percent into the :next half cycle. The routine also determines if the position of throttle valve 16 is to be open or partly closed by comparing the downloaded flow rate to the preset value. To open the throttle valve position, microprocessor 30 pulses to trigger a power triac of a valve control 56.

Preferably, transfer prover 10 includes an indicator, such as an LED (not shown), to indicate to the test technician that he can manually start and stop a test run using a start/stop push button. Also, during a test run microprocessor 30 preferably flashes the LED to indicate that a test is in progress.

Microprocessor 30, preferably, includes an internal asynchronous receiver and transmitter that is used to communicate with computer 22. Data received from computer 22 is presented to microprocessor 30, which activates a receive program routine stored in microprocessor 30. The receive program routine signals a transmit program routine that, in turn, echoes the received message to enable computer 22 to verify that controller 10 has stored the message content without error. This communication between controller 20 and personal computer 22 is achieved through a port selector 58 and RS-232 interface 60.

Prover 10 may incorporate master meters of varying capacity, in which case provision is made to ensure that the test technician has connected the correct master meter for a given test. This can be accomplished, for example, by having the plugs for the electrical connections of the various meters generate separate signals to .microprocessor 30. A wrong meter program routine stored in microprocessor 30 then checks the state of these input signals against the downloaded meter size and generates an error message if they disagree.

Preferably, controller 20 includes provision to test a field meter 12 that is equipped with a volume correction computer (not shown). One possibility for accommodating the volume correction computer (VCC), is to share the computer communication port of microprocessor 30 between the VCC and computer 22 by using port selector 58, as shown in FIG. 2. Another possibility is to accept the pulse input from the VCC at signal conditioner 50, which otherwise represents the test volume from the field meter under test. The conditioned signal is then routed to microprocessor 30 wherein it functions as a test volume signal.

In operation controller 20 employs multiplexed analog-to-digital converted pressure and temperature transducer measurement signals into relative 12-byte binary values on a one-second time basis. Because computer 22, which is preferably IBM PC compatible, has powerful computation capability these relative values are converted to actual engineering units by computer 22 through, for example, applying zero and span calibration factors to yield the highest possible accuracy of measurement.

In the present invention, controller 20 performs the basic functions of data gathering and sequential control of the test cycles and computer 22 downloads the required information to initiate the desired operation and converts the gathered data to accuracy test results. Computer 22 signals controller 20 to begin a test sequence by downloading the master meter type, the number of pulses from the field meter that constitute the selected test volume, and one to three values that constitute a selected flow rate for each test cycle. Controller 20 responds by sending a message to computer 22 on a one second time interval. The message sent by controller 20 contains test status, measurement signal values, test fluid flow rate, accumulated test volume, and test duration.

Before running a field meter or other diagnostic test, computer 22 runs a test sequence to confirm that the various devices are properly connected, that controller 20 has operating power, and that valid communication is occurring between computer 22 and controller 20. This confirmation test sequence concludes by establishing zero offset values for the four pressure values $P_1$-$P_4$ while they are at their zero ambient pressure state.

If the test sequence fails to confirm one or more of the above factors, it causes computer 22 to display an error message to inform the test technician which problem to correct. When no error is detected, computer 22 signals controller 20 to begin its test cycle and displays a message for the test technician to acknowledge completion of a field meter purge, as discussed in detail below.

Controller 20 begins a test cycle by turning on blower 14, positioning throttle valve 16, and adjusting the speed of blower 14 to the first preset flow rate. This blower speed adjustment forces air through field meter 12 thus purging any gas that may be present. When the test technician acknowledges completion of the field meter purge computer 22 sends a message to enable the test sequence to continue.

Upon being enabled and reaching the first preset flow rate, controller 20 looks for the next pulse being sensed from the field meter 12 and begins accumulating the higher frequency pulses from the master meter which represent the actual volume of the test. This is to say that pulser 26, preferably, has a higher resolution than pulser 24. At this point, controller 20 indicates to computer 22 that the test run has started and the test run duration reading begins to increment. Once pulser 24 indicates to controller 20 that field meter 12 has passed the prescribed test volume, controller 20 freezes the detected volume of master meter 18 and also the test duration readings. Controller 20 then indicates to computer 22 that the test run has been completed.

Upon completion of the test run, computer 22 then averages the pressure and temperature values, and calculates the percent uncorrected proof of the field meter with reference to the master meter 18 reading. Computer 22 also calculates pressure and temperature correction factors and converts the uncorrected proof value to percent corrected proof, accuracy, and error.

A test technician, wanting to perform a field meter test, first connects field meter 12 to prover 10 by connecting hose 28 to the outlet of field meter 12 and the inlet of master meter 18, connecting the pressure and temperature sensors and attaching the test volume pulser 24 to the field meter. Next, the technician either selects a preconfigured test sequence or configures a test sequence by making entries via a prompting configuration graphic screen.

FIGS. 3A–3F, disclose a flow chart of a preferred field meter test. At step 302 the technician enters the number of times each test is to be run, the master meter type, test volume to be passed by field meter 12, the number of field meter pulses per unit volume, and the flow rate for each test cycle. At this point computer 22 runs a test sequence to confirm that the field devices are connected properly, there is power to controller 20, and there is proper communication between computer 22 and controller 20.

This confirmation is accomplished by the computer 22 sending out a data message and controller 20 echoing the message back to computer 22 for verification. At step 304 computer 22 prompts controller 20 to confirm if the field devices are connected. If they are not, step 306 prompts computer 22 to display an error message such as "FIELD DEVICES NOT CONNECTED." Once it is confirmed that the field devices are connected, step 308 prompts controller 20 to confirm that controller 20 has proper operating power. If there is improper power to controller 20, step 310 causes computer 22 to display an error message such as "NO CONTROLLER OPERATING POWER." If controller 20 has proper power at step 310, then the routine proceeds on to step 312 wherein controller 20 confirms to computer 22 if there is good communication therebetween.

If there is a bad link between computer 22 and controller 20, step 314 prompts computer 20 to display an error message such as "BAD COMMUNICATION BETWEEN COMPUTER AND CONTROLLER." If, however, at step 312 there is proper communication between computer 22 and controller 20, the program proceeds on to step 316 wherein zero offset values for the pressure transducers, $P_1$–$P_4$ are established at zero gauge pressure.

It is noted that, steps 304–316 are performed before any diagnostic test is performed. These steps have been included only in the flow chart of the test of the field meter but steps 304–316 would also be performed with respect to the tests of FIGS. 4–6.

Figure 3A:
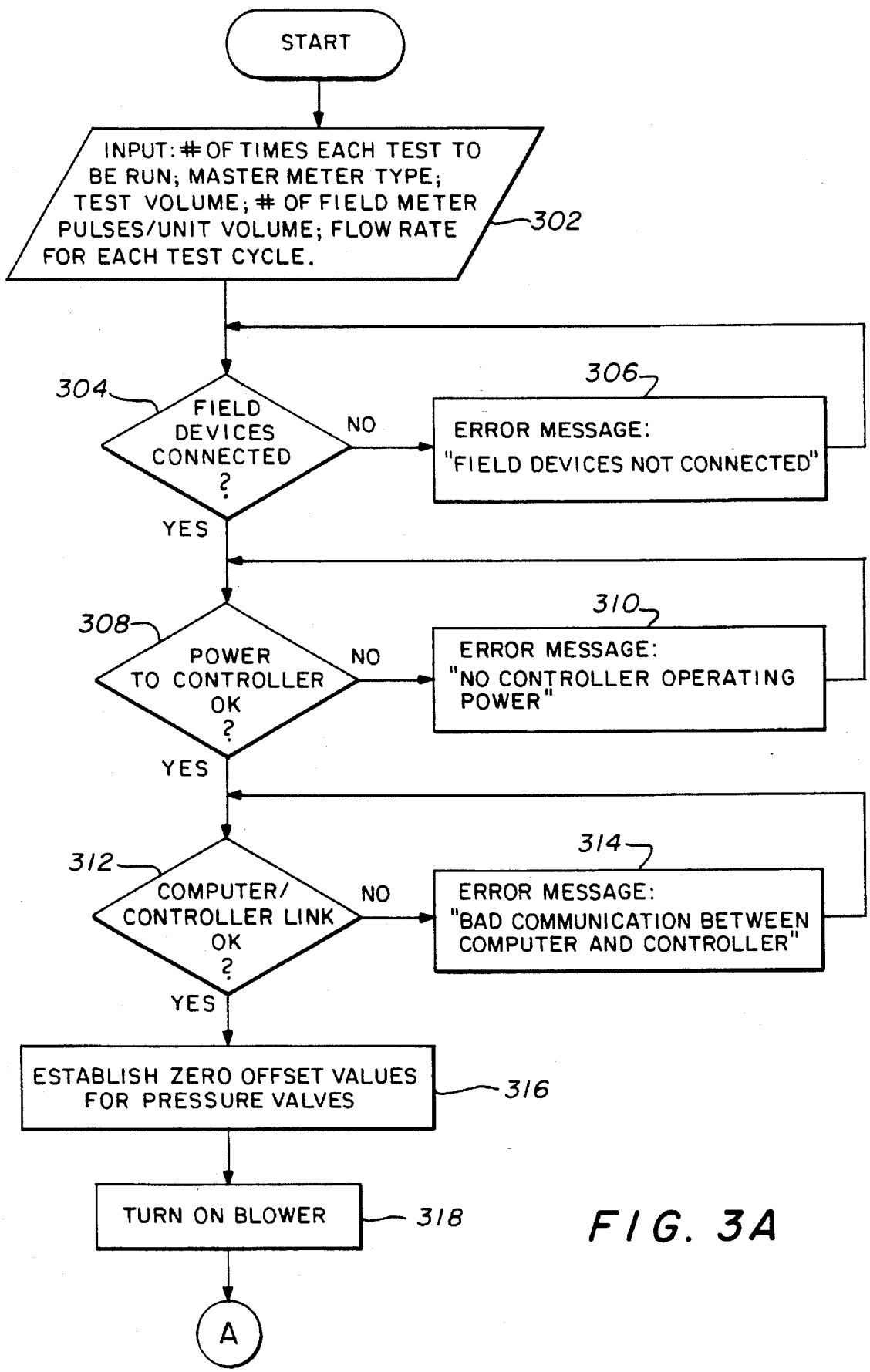
FIGS. 3A–3F are flow charts of the operation of the system for proving the accuracy of a field meter.
Figure 3B:
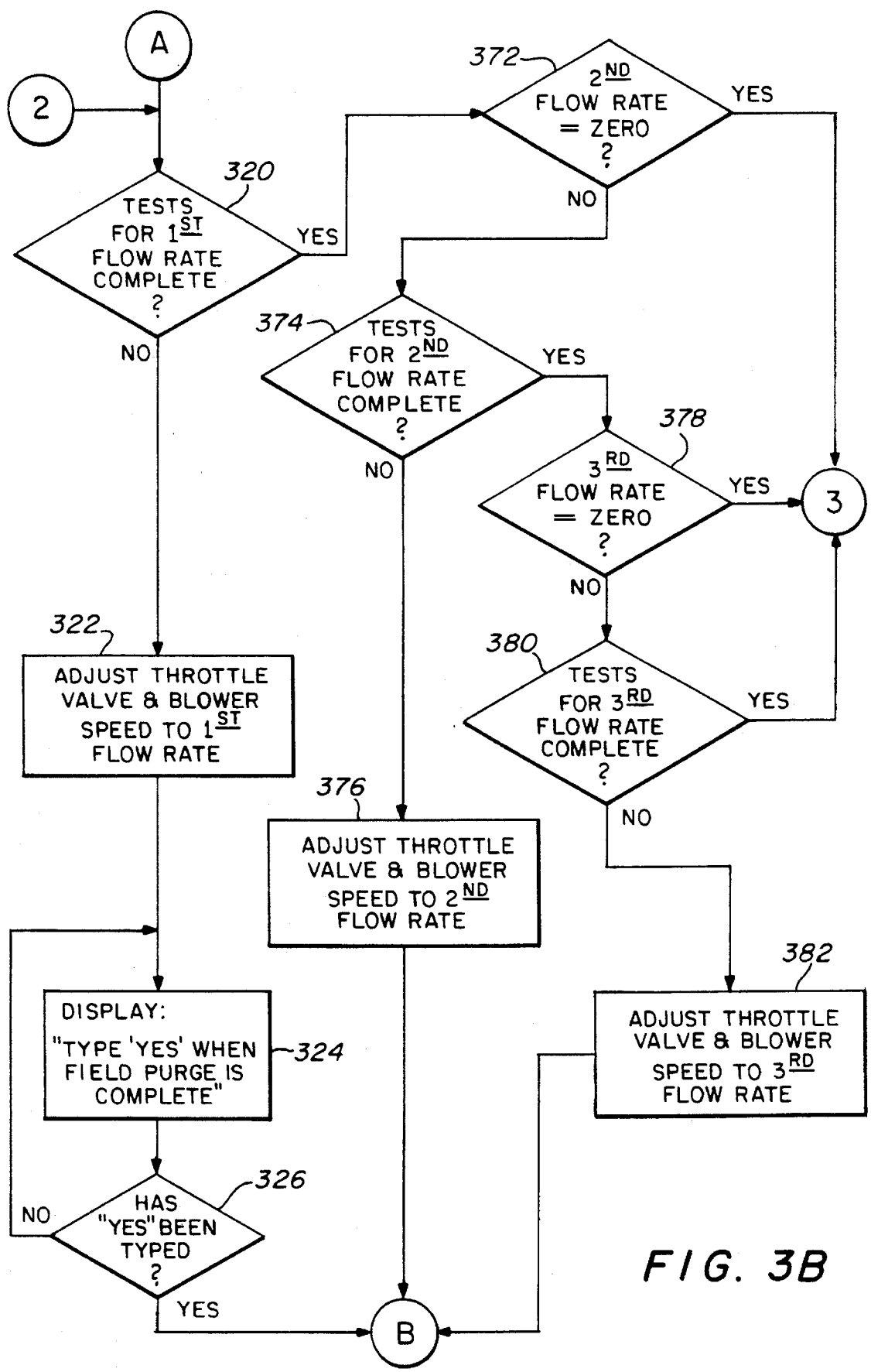

At step 318, controller program testing of field meter 12 begins by activating blower 14. As shown in FIG. 3B, step 320 then determines whether the test for the first flow rate have been completed. If the answer is "NO", the program proceeds to step 322 where throttle valve 16 and the speed of blower 14 are adjusted to the first flow rate. Next, step 324 prompts computer 22 to display a message such as "TYPE 'YES' WHEN FIELD PURGE IS COMPLETE" to the test technician. At step 326 the program continues to loop back to step 324 to display the field purge complete message until indicated by the technician. The program then continues on to step 328.

Figure 3C:
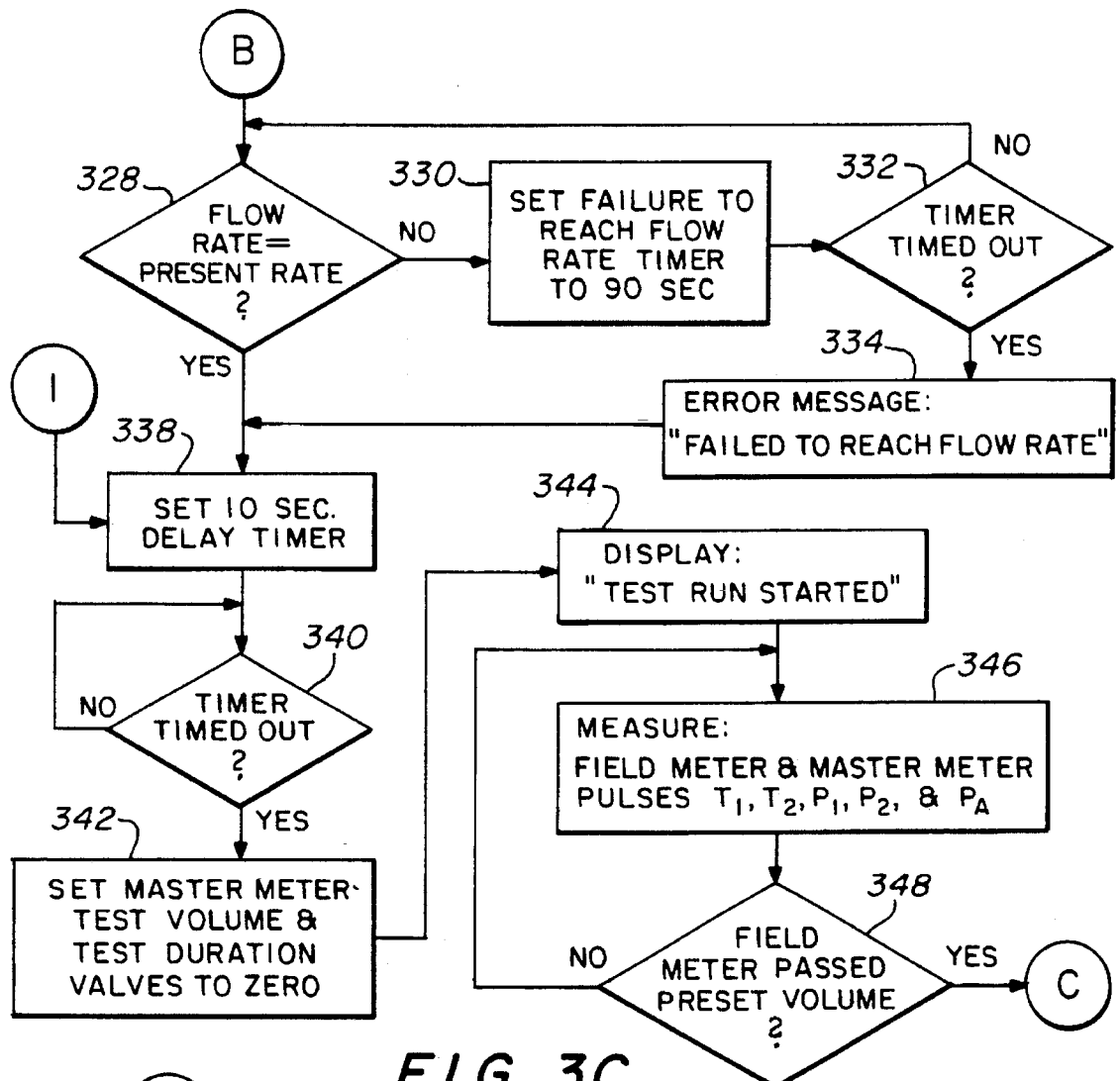

Step 328, shown in FIG. 3C, determines whether the flow rate through prover 10 is equal to the present preset flow rate. If "NO", step 330 sets a failure to reach flow rate timer to 90 seconds. Next, step 332 determines whether the timer of step 330 has timed out. If "YES", the program at step 334 prompts computer 22 to display an error message such as "FAILED TO REACH FLOW RATE" and then continues the program at step 338. If, however, at step 332 the timer has not timed out, the program loops back to step 328 where, if the flow rate equals the preset rate, the program proceeds to step 338 and sets a 10-second delay timer.

Step 340 then determines if the delay timer has timed out and will loop back through step 340 until it has. Next, step 342 sets the master meter test volume and test duration values in microprocessor 30 to zero. The program then prompts computer 22 at step 344 to display a message such as "TEST RUN STARTED".

Figure 3D:
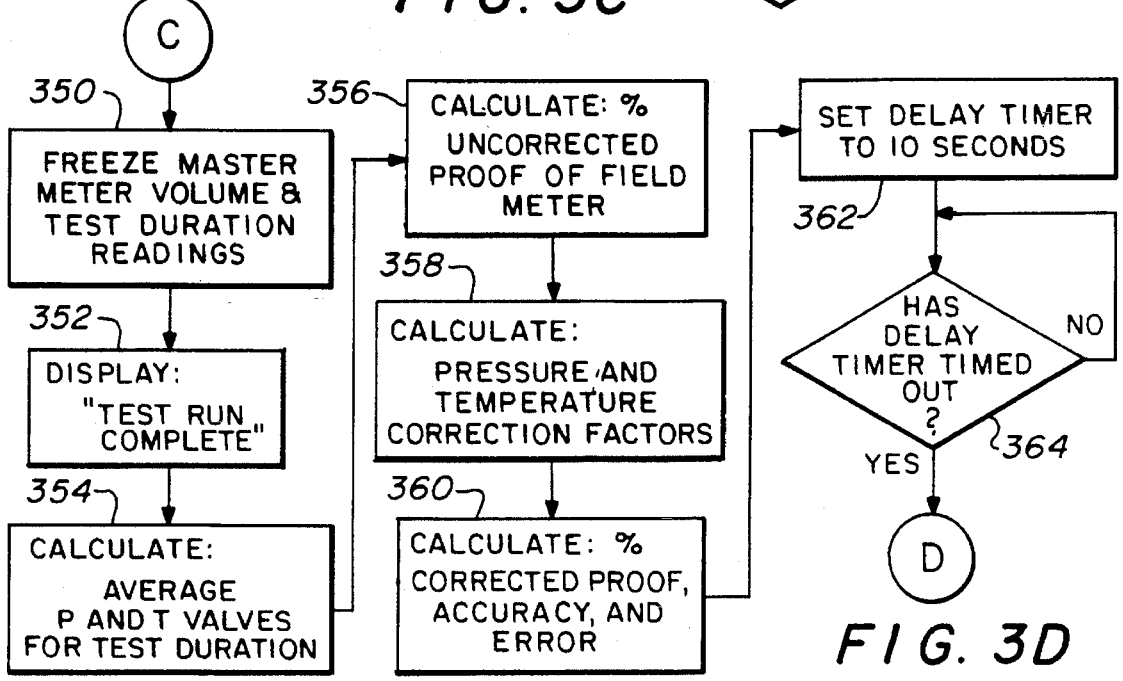
Figure 3E:
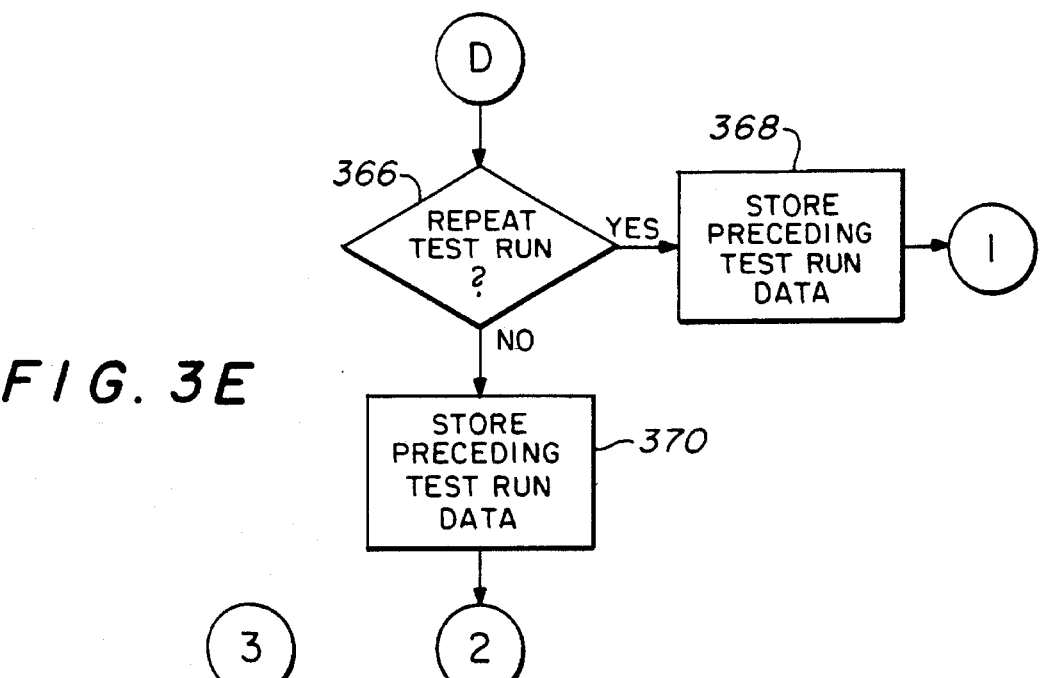

Upon detecting the next field meter volume pulse, the master meter volume counter and test duration counters are enabled and the temperature and pressure values, from $P_1$–$P_4$, $P_A$, $T_1$, and $T_2$, are measured by controller 20, at step 346, at, for example, on one second intervals. Next, step 348 determines whether the field meter has reached the preset test volume. If "NO", the program loops back to step 346 and continues taking the required measurements. However, if the answer at step 348 is "YES", the program proceeds to step 350 as shown in FIG. 3D.

At step 350 the master meter volume and test duration readings are frozen by disabling their respective counters in microprocessor 30. Next, step 352 causes controller 20 to prompt computer 22 to display a message such as "TEST RUN COMPLETE." The program at step 354 prompts computer 22 to calculate the average pressure and temperature values for the test duration. Then, in step 356, computer 22 calculates a percent uncorrected proof of field meter 12 according to the equation:

$$\% \text{ uncorrected proof} = V_m/V_f \cdot 100\%$$

Wherein $V_f$ is the fluid flow volume passed by field meter 12 and $V_m$ is the fluid flow volume passed by master meter 18 as detected by controller 20 from pulsers 24 and 26, respectively.

Step 360 prompts computer 22 to convert the % uncorrected proof to % corrected proof, accuracy, and error according to the equations:

$$\% \text{ corrected proof} = V_m/V_f \cdot P_{2avg}/P_{1avg} \cdot T_{1avg}/T_{2avg} \cdot 100\%; \text{ and}$$

$$\% \text{ error} = \% \text{ accuracy} - 100\%$$

Where $P_{1avg}$=calculated average pressure of the fluid flow adjacent the input of field meter 12 during the test run, $P_{2avg}$=calculated average pressure of the fluid flow adjacent the input of master meter 18 during the test run, $T_{1avg}$= calculated average temperature of the fluid flow adjacent the input of field meter 12 during the test run, and $T_{2avg}$= calculated average temperature of the fluid flow adjacent the input of master meter 18 during the test run.

Once computer 22 has completed all the necessary calculations, step 362 sets a delay timer to 10 seconds. Step 364 then checks if the delay timer has timed out. If "NO" program continues to loop through step 364 until the delayed timer has timed out. Next, step 366, shown in FIG. 3E, decides whether the test run is to be repeated. If "YES", step 368 prompts personal computer 22 to store the preceding test run data and then the program loops back to step 338 at FIG. 3C as indicated by the numeral 1. On the other hand, if the previous test run is not to be repeated, step 370 prompts computer 22 to store the preceding test run data and the program loops back to step 320 of FIG. 3B as indicated at numeral 2.

At this point, the answer to step 320 would be "YES", whereupon the program proceeds to step 372 to determine the value of the next flow rate test. If the second flow rate value is not equal to 0, the program proceeds to step 374 to determine if the second flow rate test is complete. If the second flow rate test is not complete, step 376 adjusts throttle valve 16 and the speed of blower 14 to the second flow rate.

If, however, at step 374 it is determined the second flow rate test is completed, step 378 then determines if a third flow rate is equal to zero. If the answer to step 378 is "NO", step 380 determines if the tests for the third flow rate are complete. If the answer to step 380 is "NO", step 382 then adjusts throttle valve 16 and the speed of blower 14 to the third flow rate value and continues.

Figure 3F:
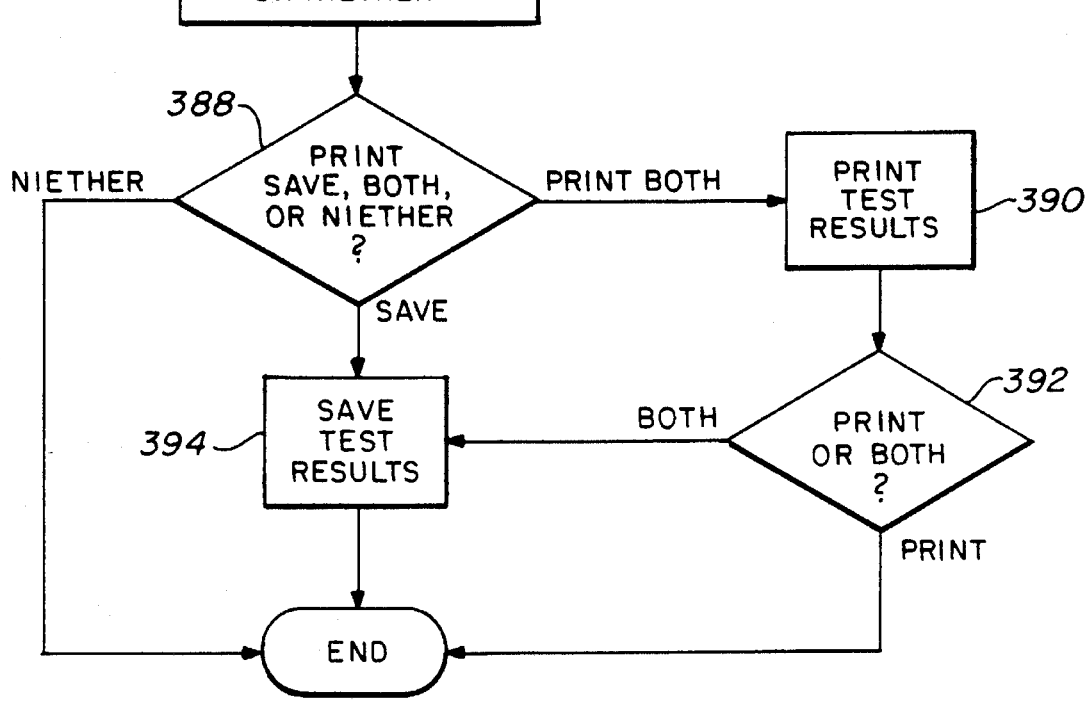

If, however, the answer to step 372, step 378, or step 380 is "YES", the program proceeds to step 384, shown in FIG. 3F. Step 384 causes personal computer 22 to display the test results.

The program then proceeds to step 386 which causes computer 22 to display a message such as "RESULTS ARE TO BE: PRINTED, SAVED, BOTH, OR NEITHER?". Step 388 then determines what option the test technician has chosen. If the "PRINT" or "BOTH" option is chosen, step 390 causes computer 22 to print the test results on a printer (not shown) attached thereto. Then step 392 determines if the results are also to be saved.

If the test results are to be "SAVED", the program proceeds to step 394 which causes computer 22 to store test results in its memory. However, if only the "PRINT" option was chosen, the program is ended. If in step 388 the "SAVE" option was chosen, then the program proceeds directly to step 394 to saves the test results and then the program is ended. If the technician chooses not to save or print the test results at step 388, the program is then immediately ended.

Figure 4:
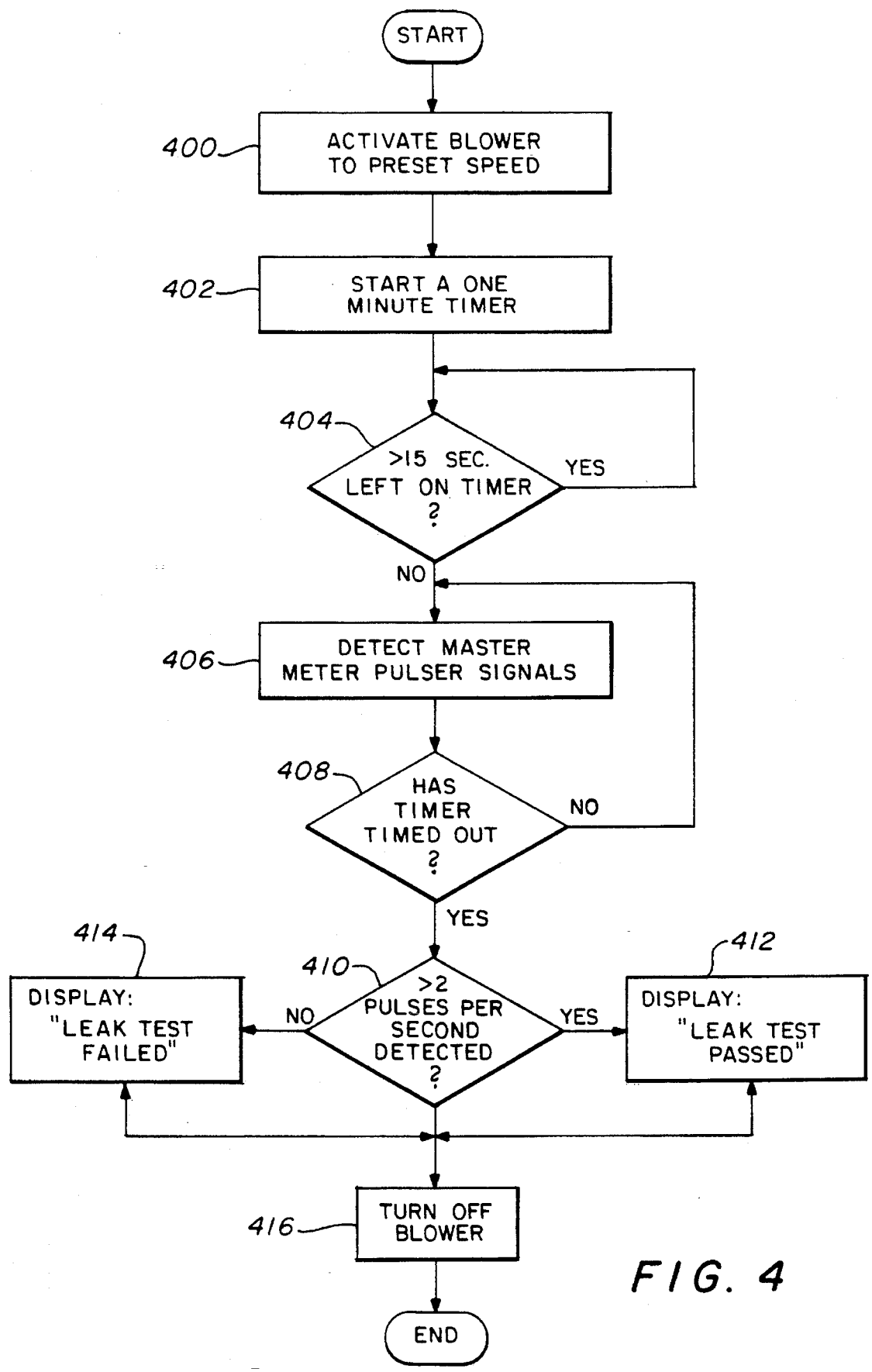
FIG. 4 is a flow chart of the operation of the system for performing a leak test.

Prover 10 is also, preferably, programmed to run other tests, such as a leak test to determine if there is any leaking occurring in any part of the prover system. To conduct a leak test, a test technician seals the inlet of quick connect hose 28 or the inlet of a connected field meter 12 and then chooses the leak test option on computer 22. Once a leak test is to be run, computer 22 signals controller 20 wherein the confirmation steps conducted at steps 304–316 are run as described above. Controller 20 then begins execution of a stored program whose flow chart is shown in FIG. 4. Blower 14 is activated at step 400 to a preset speed. Then, step 402 starts a 1 minute timer.

Next, step 404 determines if there is greater than 15 seconds left on the timer. If "YES", the program loops back through step 404 until the answer is "No", whereupon step 406 detects master :meter pulser 26 signals. Step 408 then determines if the timer has timed out. If "NO", the program loops back to steps 406–408 until the timer is timed out. Then step 410 determines if there were less then two pulses per second detected. If "YES", controller 20 prompts computer 22 at step 412 to display a message such as "LEAK TEST PASSED". If, on the other hand, there were more than two pulses per second detected, step 414 causes computer 22 to display a message such as "LEAK TEST FAILED." After step 412 or 414, step 416 turns off the blower 14 and the program is ended.

Figure 5:
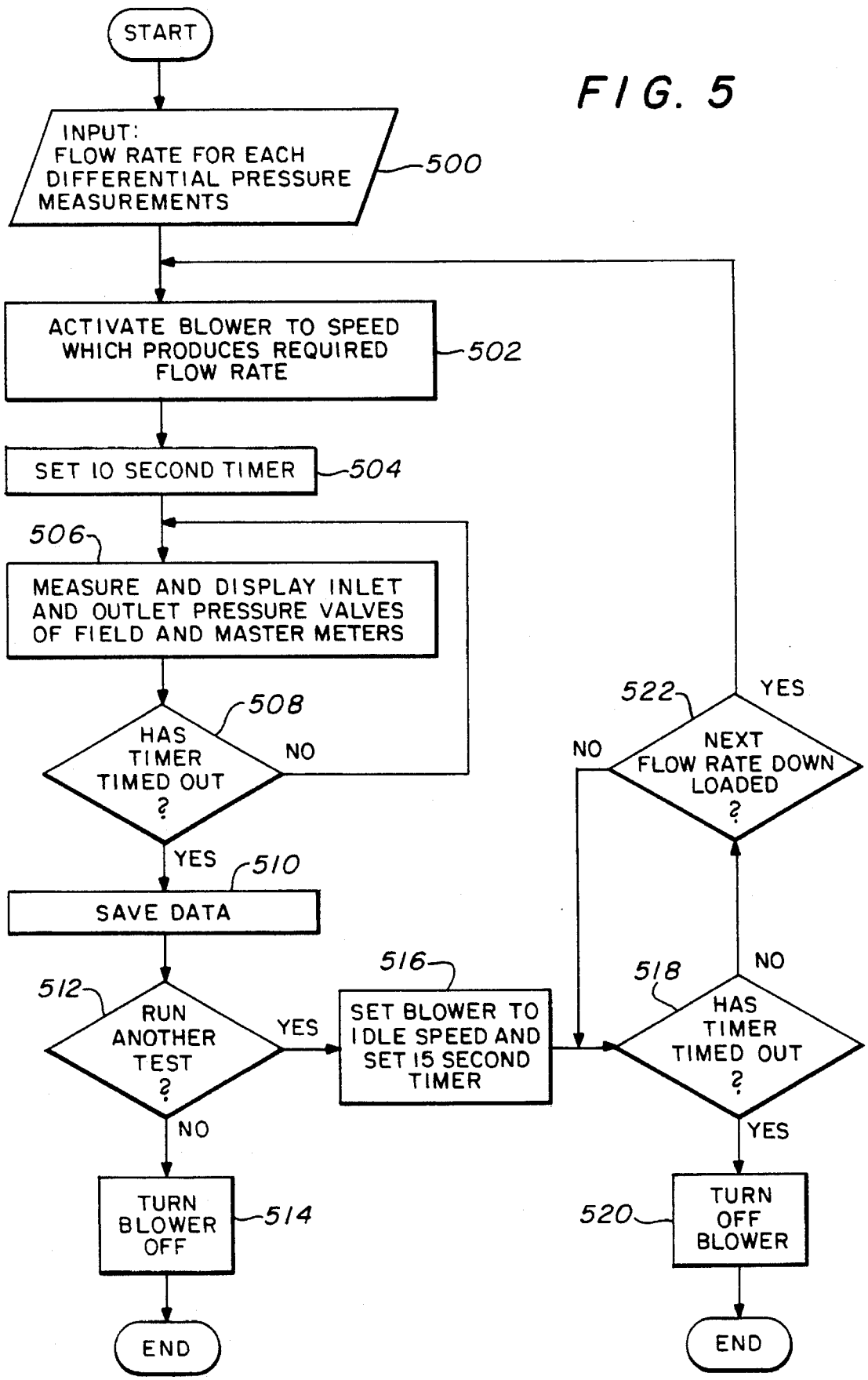
FIG. 5 is a flow chart of the operation of the system for performing a differential test.

Another test a technician may choose to run is a differential test which tests and measures the differential pressure at the inlet and outlet of the field meter 12 and master meter 18. To run a differential test, the technician connects the field and master meters to hose 28 and either selects a preconfigured test sequence or configures a test sequence by a prompted configuration graphics screen. FIG. 5 discloses a flow chart for performing a differential test. At step 500 a technician inputs the flow rate for each differential pressure measurement desired. Again, the steps 304–316 of FIG. 3A are conducted to ensure all connections have been properly made.

The controller 20 then initiates a differential pressure test sequence wherein the program continues at step 502 to activate the blower 14 to the speed which will produce the required flow rate.

Once the required flow rate is reached, step 504 sets a 10-second timer. Then, step 506 causes controller 20 to measure the inlet and outlet pressure values of the field and master meters and computer 22 to display the measurements. Computer 22 determines the pressure differential, $\Delta P$, according to the equations:

Field Meter $\Delta P = P_3 - P_1$; and

Master Meter $\Delta P = P_4 - P_2$.

Step 508 then determines if the timer has timed out. If "No", the program loops back through steps 506 and 508 until the timer has timed out. After the timer has timed out step 510 causes the data to be saved in the memory of computer 22.

The program then moves to step 512 which determines if another test is to be run. If "NO", step 514 turns blower 14 off and the program is ended. If, however, another test is to be run, step 516 sets the blower to idle speed and sets a 15-second timer. Next, step 518 determines if the timer has timed out. If "YES", step 520 turns off blower 14 and the program is ended. If "NO", step 522 determines if the next flow rate has been downloaded.

If the answer to step 522 is "NO", the program loops back to step 518. If "YES", the program loops back to step 502.

Still another test, which a technician may choose, is a prover 10 operational test to determine if master meter 18 is within preset limits. The test technician first disconnects hose 28 from the inlet of the master meter and once again performs steps 304–316 to confirm the operability of the prover system. Controller 20 then begins the execution of the stored program, as shown in the flow chart of FIG. 6. At step 600 blower 14 is activated to a speed which produces a preset flow rate. Next, at step 602 a 10-second timer is set. Step 604 determines if the timer has timed out. The program continues to loop through step 604 until the timer has timed out, whereupon step 606 causes controller 20 to detect master meter 18 volume pulses from pulser 26 and computer 22 displays the detected volume passed by master meter 18.

Step 608 then determines if the test run has run for its preset length. If "NO", the program loops back to step 606 to continue detecting master meter volume pulses. If step 608 is "YES", the program proceeds to step 610 where blower 14 is turned off and the master meter volume pulse accumulation is frozen.

Next, step 612 determines if the master meter 18 volume pulse accumulation is within preset limits. If it is, step 614 causes computer 22 to display a message such as "PROVER PASSED." On the other hand, if the master meter volume pulses were not within preset limits, step 616 causes computer 22 to display a message such as "PROVER FAILED", whereupon the program is ended.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

We claim:

1. An apparatus for automatically determining the measurement accuracy of an uncalibrated field fluid flow meter by comparing its fluid flow volume measurement, $V_f$, to a fluid flow volume measurement, $V_m$, of a master meter of known accuracy, the apparatus comprising:

a blower operably coupled to the field and master meters for passing a common fluid stream through the field and master meters at a predetermined flow rate until a predetermined volume of fluid has been registered by the field meter;

first measurement signalling means coupled to said field and master meters for generating data representing the fluid volume registered by each of said meters;

second measurement signalling means operatively coupled to the fluid stream for generating data representing a first input temperature, $T_1$, and a first input pressure, $P_1$, of the common fluid stream to the field meter and a second input temperature, $T_2$, and a second input pressure, $P_2$, of the common fluid stream to the master meter;

a computer including an input for operator interface with said apparatus and for automatically controlling the predetermined flow rate and calculating average pressures and temperatures, $P_{1avg}$, $P_{2avg}$, $T_{1avg}$, and $T_{2avg}$ and a percent field meter accuracy according to the equation:

$$\% \text{ Accuracy} = V_f/V_m \cdot P_{1avg}/P_{2avg} \cdot T_{2avg}/T_{1avg} 100;$$

said computer presenting graphic display to prompt said operator through a controlled test of the field meter;

a controller coupled to the computer for sending data to and receiving commands from said computer and for configuring a sequential control of said test of the field meter according to parameters designated by the computer and selected by the operator according to said graphic display prompts;

said blower being-operably coupled to the controller for forcing fluid through both the field and master meters as instructed by the controller;

a memory in the computer for storing a plurality of preset flow rates selectable by said operator according to said graphic display prompts and storing the calculated pressures, temperatures, and accuracy of the related field meter;

the controller being coupled to the first and second measurement signalling means;

the controller including a microprocessor for gathering data from the first and second measurement signalling means and for providing temperature, pressure, and fluid volume values to the computer; and display means for displaying the calculated pressures, temperatures, and accuracy of the tested field meter.

2. The apparatus of claim 1 wherein the computer calculates average pressure and temperature values, $P_{1avg}$, $P_{2avg}$, $T_{1avg}$, and $T_{2avg}$, and a percent uncorrected proof $V_m/V_f \cdot 100$.

3. The apparatus of claim 2 wherein the computer calculates pressure and temperature correction factors, $P_{2avg}/P_{1avg}$ and $T_{1avg}/T_{2avg}$, respectively, for calculating a percent corrected proof of the field meter according to the equation:

$$\text{Corrected Proof} = V_m/V_f \cdot P_{2avg}/P_{1avg} \cdot T_{1avg}/T_{2avg} \cdot 100.$$

4. The apparatus of claim 1 wherein the computer calculates a percent error of the field meter according to the equation:

$$\text{Error} = \%\text{Accuracy} -.$$

5. The apparatus of claim 4, the second signalling means further including means for generating third and fourth pressure values, $P_3$ and $P_4$, representative of the common fluid stream adjacent outputs of the field and master meters, respectively, for determining a pressure differential, $\Delta P$, introduced to the common fluid stream by each of the field and master meters.

6. The apparatus of claim 5 wherein the computer calculates the pressure differential, $\Delta P$, of the field and master meters according to the equations:
Field Master $\Delta P = P_3 - P_1$; and Master Meter $\Delta P = P_4 - P_2$.

7. A method for automatically determining the measurement accuracy of an uncalibrated field fluid flow meter, the method comprising the steps of:

(a) operably connecting a blower to the field meter and a master meter for passing a common fluid stream through both of the meters at a predetermined fluid flow rate for a predetermined fluid flow volume indicated by the field meter;

(b) operably coupling a controller to the blower, field meter, master meter, and a computer;

(c) providing graphic displays with said computer to prompt an operator through a controlled test of the field meter, said selected prompts causing the controller to adjust the blower to obtain a predetermined fluid flow rate through the field and master meters in response to commands from the computer as selected by the operator according to said graphic display prompts;

(d) gathering data with the controller representing a first input temperature, $T_1$, and a first input pressure, $P_1$, of the common fluid stream to the field meter and a second input temperature, $T_2$, and a second input pressure, $P_3$, of the common fluid stream of the master meter, and data representing the volume of fluid passed by each of the field meter and master meter;

(e) freezing the master meter volume data when the field meter indicates a predetermined volume has been passed;

(f) storing said frozen master meter volume data for subsequent use by said computer; and (g) calculating proof, accuracy, and error values of the field meter relative to the master meter with the computer from the gathered data and storing the calculated values in a memory portion of the computer.

8. The method of claim 7 wherein the controller includes a microprocessor.

9. The method of claim 7 further including the step of automatically running a test sequence with the computer before step (c) to confirm proper connection of the field and master meters to the controller, operating power to the controller, and valid communication between the computer and controller.

10. The method of claim 7 further including the steps of:

automatically initiating a purging procedure with the controller before step (c) to purge any unwanted fluid associated with the field meter by activating the fluid flow means; and preventing the field meter testing from continuing until an operator indicates to said computer that said purging is complete.

11. The method of claim 7 further including the steps of:

sealing the inlet of the field meter;

activating the fluid flow means for a predetermined amount of time at a predetermined flow rate;

gathering data with the fluid flow means representing the fluid flow volume of the master meter;

determining with the computer the fluid flow rate detected by the master meter and comparing the detected fluid flow rate with a predetermined rate; and providing a computer generated indication to a technician that a leak test failed when the detected fluid flow rate is greater than the predetermined rate and that the leak test passed when the detected fluid flow rate is less than the predetermined rate.

12. The method of claim 7 further including the steps of:

gathering data with the fluid flow means representing third and fourth pressure values, $P_3$ and $P_4$, representing pressures of the common fluid stream adjacent outputs of the field and master meters, respectively, for a predetermined amount of time;

calculating and displaying with the computer the difference between pressure values $P_1$ and $P_3$ and between $P_2$ and $P_4$; and storing calculated pressure differences in a memory of the computer.

13. The method of claim 7 further including the steps of:

activating the fluid flow means for predetermined amount of time at a predetermined flow rate;

gathering data representing the fluid volume passed through the master meter for the predetermined amount of time;

freezing the master meter volume data upon the elapse of the predetermined amount of time; and determining and indicating to a technician with the computer if the master meter volume data is within preset limits.

14. The method of claim 7 further including the steps of:

(f) calculating correction factors with the computer using the temperature and pressure data gathered; and (g) correcting the calculated proof, accuracy, and error of the field meter with the computer in accordance with the calculated correction factors.

15. The method of claim 14 further including the steps of:

(h) waiting a predetermined period of time; and (i) repeating steps (a) through (g) to confirm the repeatability of the test results.

16. The method of claim 15 further including the step of repeating steps (a) through (i) for a second predetermined fluid flow rate.

17. The method of claim 7 further including the steps of:

indicating to an operator with the computer the beginning and end of gathering the data; and storing the calculated proof, accuracy, and error of the field meter in a memory of the computer.

18. The method of claim 17 further including the step of measuring sensed zero pressures prior to passing the common fluid stream through the field and master meters in order to determine the pressure offset values of $P_1$ and $P_2$ and correcting their error values prior to use.

* * * * *